UNITED STATES PATENT OFFICE.

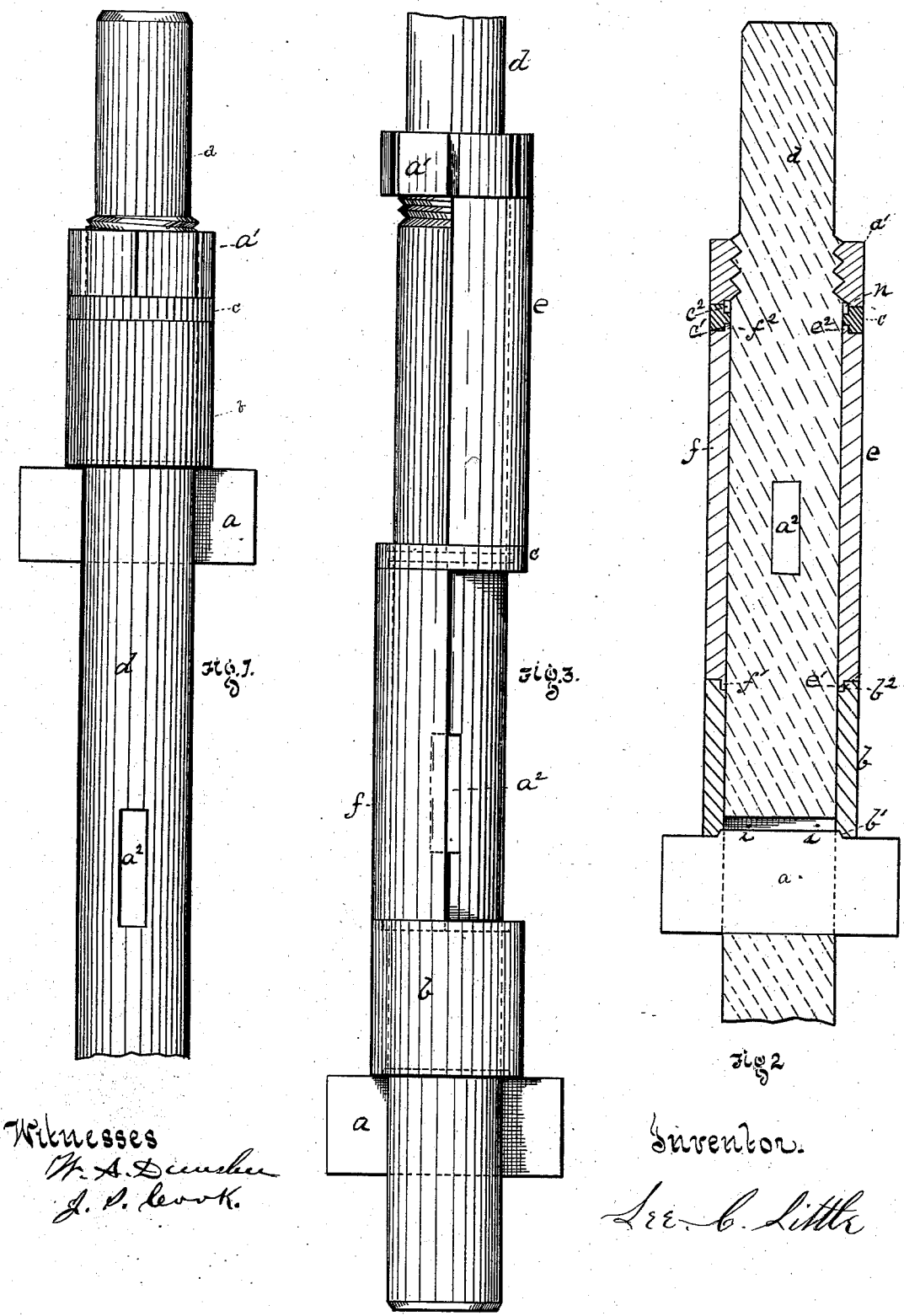

LEE C. LITTLE, OF PITTSBURG, PENNSYLVANIA.

METAL-BORING TOOL.

SPECIFICATION forming part of Letters Patent No. 225,291, dated March 9, 1880.

Application filed July 12, 1879.

*To all whom it may concern:*

Be it known that I, LEE C. LITTLE, of Pittsburg, in the county of Allegheny and State of Pennsylvania, have invented certain new and useful Improvements in Metal-Boring Tools; and I do hereby declare the following to be a full, clear, and exact description thereof, reference being had to the accompanying drawings, forming part of this specification, in which—

Figure 1 is an elevation of a portion of a boring-tool illustrating my invention, and showing the cutter in the upper slot or mortise of the cutter-stock. Fig. 2 is a central longitudinal section of the same, showing the cutter in the second slot or mortise of the stock. Fig. 3 is an elevation, showing the cutter in a third position or third slot lower down in the cutter-stock.

Each figure shows, also, the adjustment or arrangement of the sleeve or sleeves as adapted to secure the cutter in the position shown in said figure.

Like letters refer to like parts wherever they occur.

The object of my invention is to obtain a metal-boring tool in which the cutter is adjustable in the cutter bar or stock, so that the position of the cutter may be readily changed to meet the requirements of the work to be performed; and to this end it consists, mainly, in combining with a cutter bar or stock having mortises or slots, in either of which the cutter may be placed, a nut at one end of the stock and a sleeve or sleeves interposed on the stock between the nut and cutter, the nut and sleeves being adapted, when properly adjusted, to clamp and secure the cutter in the slot or mortise it may occupy; and, secondarily, in details of construction hereinafter more specifically set forth.

I will now proceed to more specifically describe devices embodying my invention, so that others skilled in the art to which it appertains may apply the same.

In the drawings, $d$ indicates the cutter bar or stock, which is mortised or slotted at points $a^2$, to receive a removable cutter, $a$, and is threaded at one end to receive a nut, $a'$.

$a$ indicates the cutter, which has upon one edge a sloping or tapered offset or projection, $i$. This offset $i$ fits within the end of the clamping-sleeve $b$, and thus enables the sleeve, when forced down by the nut $a'$, not only to lock the cutter in position, but also, owing to the bevels on the ends of the offset, to cause the cutter to adjust itself or center with relation to the stock so as to cut true.

$b$ indicates a sliding sleeve arranged on the stock between the cutter and clamping-nut $a'$. This sleeve, which is usually such length as to enable it to be used either with or without the collar or coupling $c$, hereinafter described, for securing the cutter in the first slot of the stock, is counterbored at one end, as at $b'$, so that it may receive the offset $i$ of cutter $a$, and thus prevent the endwise displacement of the cutter, and is counterbored at the other end, as at $b^2$, to receive a tongue (or tongues $f'$ $e'$, as the case may be) upon the split sleeve $e f$.

$e f$ represent the halves or sections of a split sleeve shaped to fit the cutter bar or stock. The sections composing this split sleeve are provided at both ends with tongues $e'$ $e^2$ $f'$ $f^2$, adapted to fit within the counterbored end $b^2$ of sleeve $b$ and sliding collar or coupling $c$, so that when in position the parts are locked together.

$c$ indicates a sliding collar or coupling, which is employed when the cutter is used in the third or lower slot or mortise, (see Fig. 3,) and said coupling is counterbored on both faces, as at $c'$ $c^2$, in order to receive the tongues upon the ends of the split sleeve. The nut $a'$ is also counterbored, as at $n$, for a similar purpose.

The construction of the parts being substantially as specified, they are adjusted and operate as follows: The sliding sleeve $b$, coupling $c$, and nut $a'$ are placed on the cutter bar or stock $d$. If the cutter $a$ is to be used in the upper slot, (see Fig. 1,) it is then placed therein, the sleeve $b$ pushed down against it and over the projection $i$, the coupling $c$ (if used) pushed against the sleeve $b$, and the nut $a'$ screwed down to clamp and secure the whole.

Should it be desirable to change the cutter to the second mortise, (see Fig. 2,) the nut $a'$ is loosened, the sleeve $b$ drawn up to release the cutter, the cutter $a$ transferred to the second mortise or slot, the sleeve $b$ pushed down against the cutter, the split sleeve (sections $e$

*f*) interposed between the sleeve *b* and coupling *c*, (the tongues of the split sleeve entering the counterbored ends of the coupling and sleeve *b*, as before specified,) and the nut *a'* again screwed down to clamp and hold the parts.

To secure the cutter in the third slot or mortise, (see Fig. 3,) the cutter *a* is placed in said mortise and the sleeve *b* pushed down against it, as before specified. One section, *f*, of the split sleeve is then placed above the sleeve *b*, and the coupling *c* is brought down against it; the other section, *e*, is then interposed between the coupling *c* and nut *a'*, and the nut screwed down to clamp and secure the interlocked parts.

It is evident that where the cutter is to be used in but a single mortise of the stock *d*, or at most two mortises, the coupling-ring *c* may be omitted, and the split sleeve only inserted when the cutter *a* is changed from the first to the second mortise; but as one of the great advantages of my invention is the ability to change the cutter readily from one mortise to any other of a series in the stock, and to firmly and effectually secure the cutter therein without removing the cutter-stock from the machine, I prefer to adjust the sleeve *b* and coupling-ring *c* on the stock (see Fig. 1) at the time the tool is inserted in the machine.

It is also evident that any number of slots or mortises may be used in the cutter-stock, and any practicable number of adjustments of the cutter obtained by simply regulating the length of and duplicating the split sleeve and coupling-ring.

Having thus described my invention, what I claim, and desire to secure by Letters Patent, is—

1. An improved metal-boring tool consisting of a cutter stock or holder having two or more mortises for the reception of the cutter, a screw-nut at one end of said stock, and two or more sleeves placed intermediate between the cutter and the nut, said nut and sleeves being designed to clamp and hold the cutter firmly in place in whichever mortise it may be placed, substantially as specified.

2. The improved boring-tool herein described, consisting of the cutter stock or holder *d*, having three or more mortises through it for the reception of the cutter and a screw-thread at one end, the nut *a'*, the sliding sleeve *b*, coupling-piece *c*, split sleeve *e f*, and the cutter, substantially as and for the purpose specified.

LEE C. LITTLE.

Witnesses:
W. A. DUNSHEE,
J. S. COOK.